United States Patent
Lam et al.

(10) Patent No.: US 9,807,544 B2
(45) Date of Patent: Oct. 31, 2017

(54) ADDITION OF SECONDARY ENDPOINT BASED ON MESSAGE REPLY

(71) Applicant: Verizon Patent and Licensing Inc., Arlington, VA (US)

(72) Inventors: Andrew Wahlon Lam, River Edge, NJ (US); James K. Choe, Hillsborough, NJ (US); Jason A. Coglon, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 14/750,685

(22) Filed: Jun. 25, 2015

(65) Prior Publication Data

US 2016/0381549 A1 Dec. 29, 2016

(51) Int. Cl.
*H04W 4/00* (2009.01)
*H04W 4/06* (2009.01)
*H04W 4/14* (2009.01)
*H04W 12/06* (2009.01)
*H04W 88/18* (2009.01)

(52) U.S. Cl.
CPC ............ *H04W 4/008* (2013.01); *H04W 4/06* (2013.01); *H04W 4/14* (2013.01); *H04W 12/06* (2013.01); *H04W 88/184* (2013.01)

(58) Field of Classification Search
CPC ..... H04W 48/08; H04W 12/06; H04W 12/08; H04W 4/008; H04W 4/14; H04W 84/045; H04W 8/18

USPC .............................. 455/454, 26.1, 528, 435.1
See application file for complete search history.

(56) References Cited

U.S. PATENT DOCUMENTS

| | | | |
|---|---|---|---|
| 9,084,284 B1* | 7/2015 | Shipley | H04W 80/04 |
| 2013/0132854 A1* | 5/2013 | Raleigh | G06F 3/0482 715/738 |
| 2013/0339439 A1* | 12/2013 | Deng | H04L 67/1095 709/204 |
| 2014/0162595 A1* | 6/2014 | Raleigh | H04L 67/22 455/405 |

* cited by examiner

*Primary Examiner* — Inder Mehra

(57) ABSTRACT

A method for adding an additional endpoint for a service based on a short messaging service (SMS) message may include receiving a request to add a second user equipment (UE) as an additional endpoint for a service associated with a first UE, and generating a transaction identifier in response to receiving the request. The method may include sending a command to provide a short message service (SMS) message to the first UE requesting permission to add the second UE as the additional endpoint, and receiving a message granting permission to add the second UE as the additional endpoint, where the message may include a network identifier assigned to the first UE. The method may include generating credential(s) for authorizing the second UE to access the service, and may then provide the credential(s) to the second UE.

20 Claims, 11 Drawing Sheets

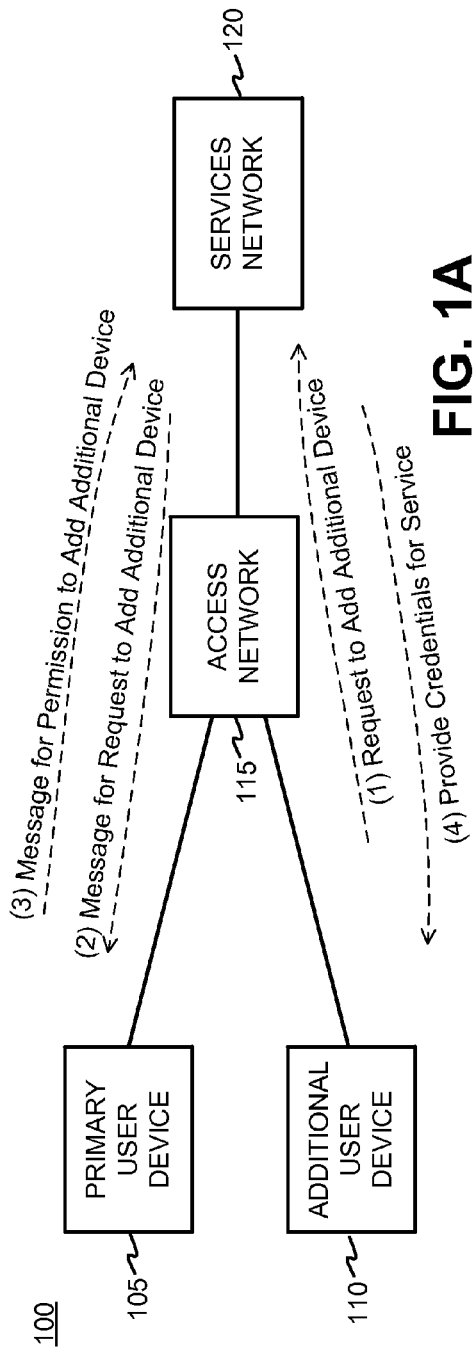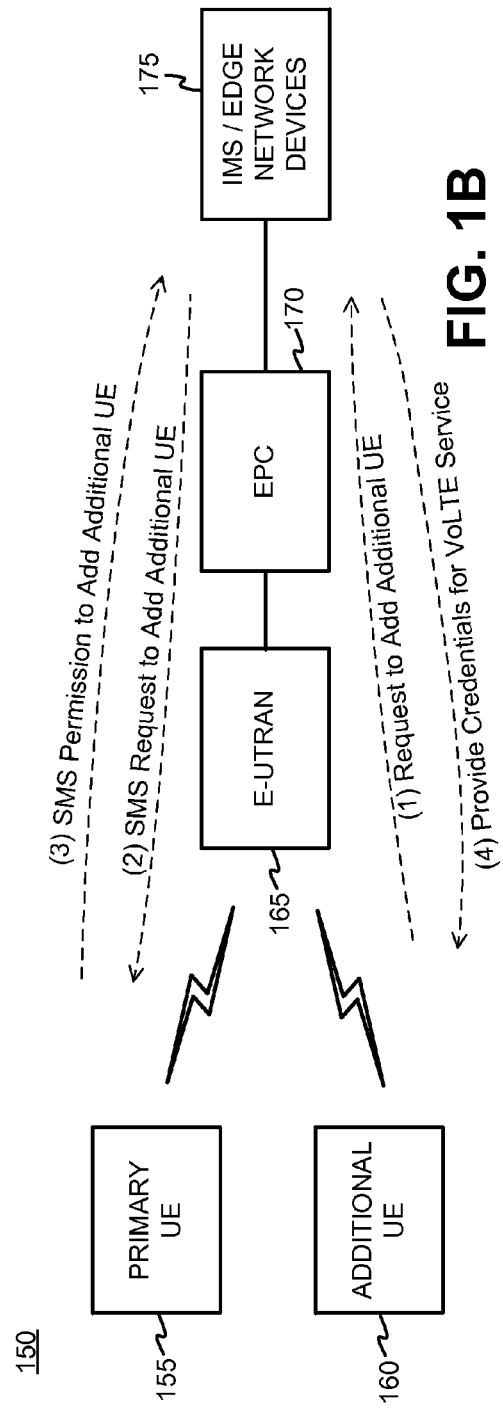

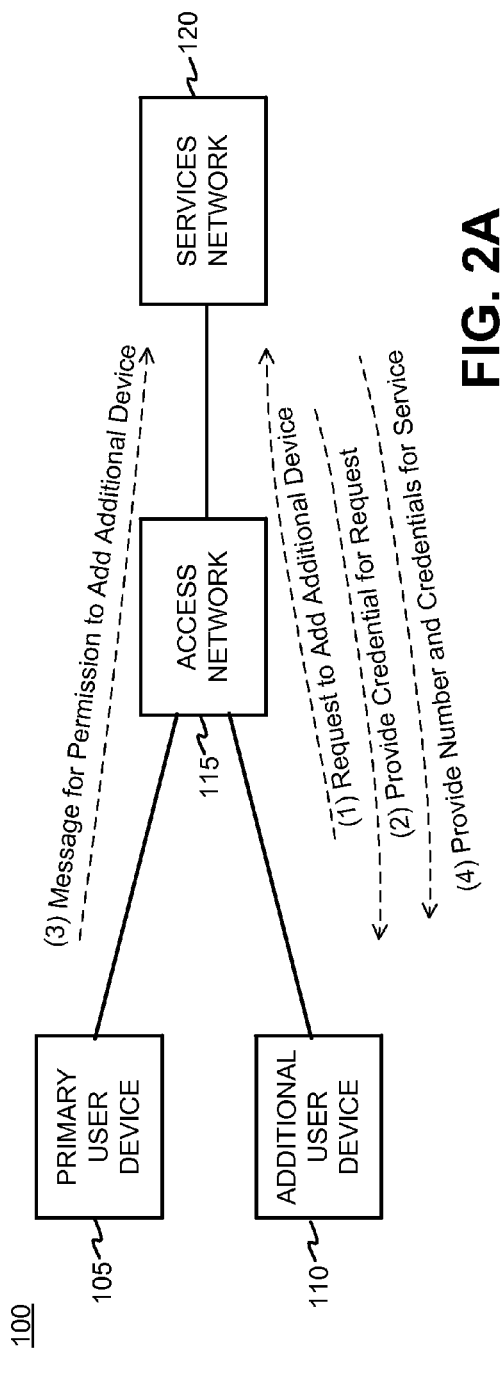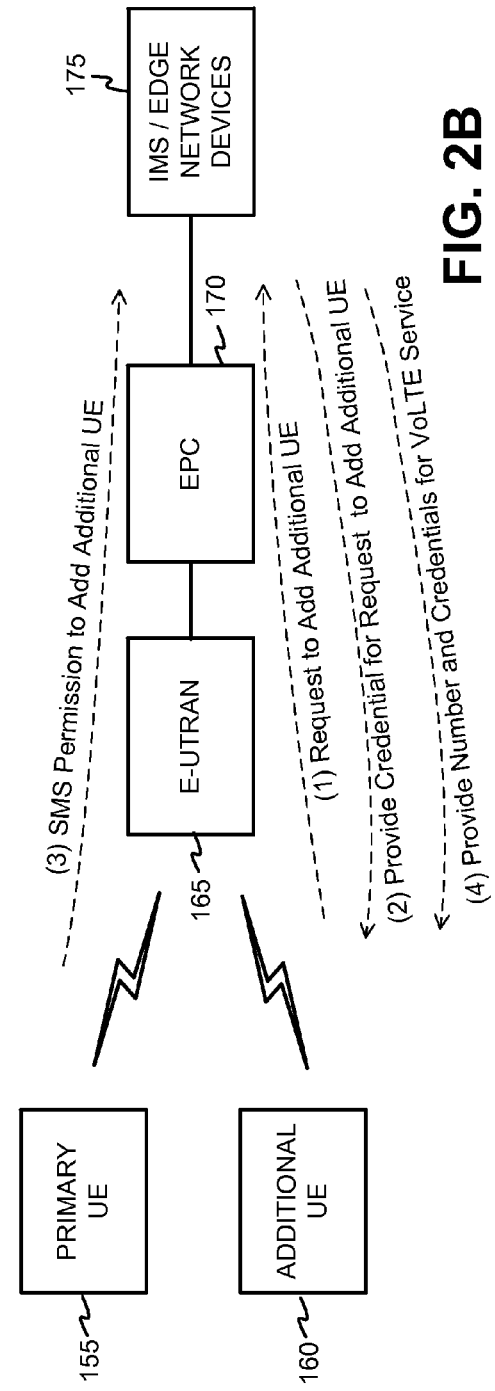

ADDITION OF SECONDARY ENDPOINT BASED ON MESSAGE REPLY

BACKGROUND

Modern communications systems may permit access to a service through multiple devices acting as user endpoints. For example, a user may initially access a voice over long term evolution (VoLTE) service using a smartphone acting as a primary endpoint. As a convenience to facilitate access to the service, the user may add a secondary endpoint (e.g., a tablet) associated with the phone number of the smartphone for the VoLTE service. Once added, the tablet, acting as the secondary endpoint, may send and/or receive VoLTE calls using the phone number of the smartphone. In conventional systems, designating the secondary endpoint for a service may involve having the user manually enter one or more network identifiers (e.g., the phone number) of the primary endpoint and/or validating credentials into the device that the user wishes to designate as the secondary endpoint.

BRIEF DESCRIPTION OF THE DRAWINGS

FIGS. 1A and 1B are block diagrams of exemplary network environments which may add additional endpoints based on a short message service (SMS) message according to a first messaging embodiment;

FIGS. 2A and 2B are block diagrams of exemplary network environments which may add additional endpoints based on an SMS message according to a second messaging embodiment;

DETAILED DESCRIPTION OF THE PREFERRED EMBODIMENTS

Figure 3:
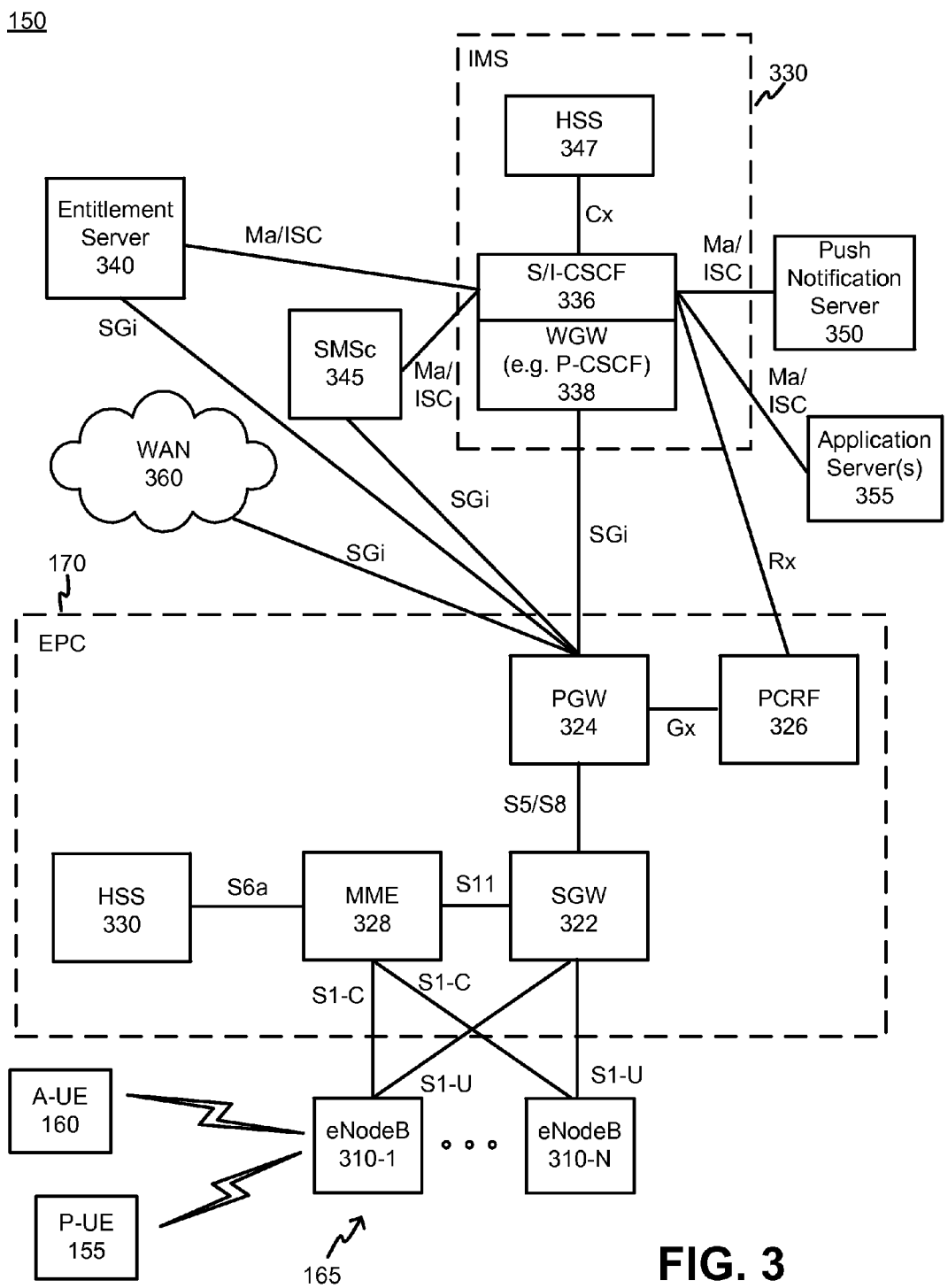
FIG. 3 is a block diagram illustrating components of an exemplary wireless network environment.

The following detailed description refers to the accompanying drawings. The same reference numbers in different drawings may identify the same or similar elements. The following detailed description does not limit the invention.

Embodiments described herein are directed to approaches for adding endpoints by having a user reply to a requesting a message (e.g., an SMS message) sent for the purpose of adding the additional endpoint. The reply, which may also be in the form of an SMS message, avoids the user having to manually enter a network identifier of the primary device, and/or validating credential(s) for the service, into another device in order for that device to be added as an additional endpoint. By simply replying to the requesting message, the user may reduce the amount of information which is manually entered for adding an endpoint which may be required in conventional systems. The reduction in the amount of information manually entered by the user can be especially useful for devices having small screens and/or limited text entry capabilities, such as, for example, modern smart watches and/or other wearable devices.

FIG. 1A is a block diagram of an exemplary network environment 100 which may add an additional endpoint based on a message according to a first messaging embodiment. Network environment 100 may include a primary user device 105, an additional user device 110, an access network 115, and a services network 120.

Primary user device 105 and additional user device 110 may communicate with access network 115 over wireless and/or wired channels to exchange information with other networks, including services network 120. Access network 115 may exchange data with services network 120 directly over standard connections, and/or through a wide area network (not shown). In an embodiment, primary user device 105 and additional user device 110 may exchange messages with services network 120, over access network 115, to facilitate the use of one or more services.

Based on the network environment shown in FIG. 1A, a user may interact with a service provided by services network 120 through a primary user device 105. The user may find it convenient to access the service though secondary device, shown in FIG. 1A as additional user device 110. Additional user device 110 may access the service using the network identifier of the primary user device 105. For example, if a text messaging service were being used, once additional user device 110 is added as an endpoint, additional user device 110 may be utilized to receive and send text messages as if it were primary user device 105. It should be noted that additional user device 110 does not necessarily replace primary user device 105. For example, as initial incoming messages and/or outgoing messages associated with the service may be exchanged by both primary user device 105 and additional user device 110. However, the user, as a matter of preference, may select which device to employ for an ongoing session in which subsequent messages are exchanged after the session has been initiated. Moreover, if desired, the user may switch devices in mid-session if one user device is more preferable than another as an endpoint.

FIG. 1A shows an exemplary high-level message exchange according to a first messaging embodiment for establishing additional user device 110 as an additional endpoint. The message exchange may occur in the following sequence: (1) Additional user device 110 may provide a request to services network 120 to add additional device 110 as an endpoint. The request in (1) may be made using a standard protocol, and may include authenticating information and or one or more identifiers, including a network identifier (e.g., phone number, internet protocol (IP) address, medial access controller (MAC) address, etc.) of primary user device 105. (2) Services network 120 may respond to the request by sending a message to primary user device 105 to request the addition of additional user device 110. The message in (2) may be sent in a standard format, such as, for example, an SMS message, and include authenticating information and/or one or more identifiers provided in the request (1). The message in (2) may also include a particular text word or phrase that a user may enter to explicitly authorize additional user device 110 as an additional endpoint. (3) Primary user device 105 may respond to the message in (2) with a message to services network 120 providing permission to add addition user device 110. The permission to add in (3) may be provided in an interactive manner by the user, and may take the form of an SMS reply. (4) Additional user device 110 may receive credentials for accessing the service provided by services network 120. The message in (4) may be in a standard format (e.g., a hypertext transfer protocol (HTTP) message) and include various tokens, personal identification numbers (PINs), etc. Once the credentials are received, additional user device 110 may be used as an additional endpoint for the service provided by services network 120.

Primary user device 105 and/or additional user device 110 may be any type of communications device compatible with access network 115, including both wired and wireless connections. Primary user device 105 and/or additional user device 110 may include, for example, a cellular radiotelephone, a smart phone, a tablet, a set-top box (STB), a mobile phone, a smart TV, any type of IP communications device, a Voice over Internet Protocol (VoIP) device, a personal computer (e.g., a desktop, laptop computer, or palmtop computer), a gaming system, a media player device, or a digital camera that includes communication capabilities (e.g., wireless communication mechanisms).

Access network 115 may be any type of wired and/or wireless network. For example, access network 115 may include one or more wireless networks of any type, such as, for example, a local area network (LAN) such as WiFi (IEEE 802.11x, where x=a, b, c, g, n, and/or AC), a wide area network (WAN) such as WiMAXX, a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. Access network 115 may also include wired networks including any type of LAN and/or (WAN), For example, the WANs may include backhaul networks and/or core networks, and may further include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Services Network 120 may include one or more standard networks and network devices for providing a network service. The services may include voice, text, and/or video communication services, text, music, and/or video content distribution services, e-commerce services, cloud-based services, banking services, financial services, etc. Services network 120 may further include so-called "edge devices" and/or other network devices which are not included in the standard services networks, but may be used to facilitate services with user devices (e.g., 105 and/or 110) and/or access network 115, and/or any other intervening network (not shown) in communications with access network 115.

While FIG. 1A shows exemplary components of network environment 100, in other implementations, network environment 100 may include fewer components, different components, differently arranged components, or additional components than depicted in FIG. 1A. Additionally or alternatively, one or more components of network 100 may perform functions described as being performed by one or more other components.

In one example, primary user device 105 and additional user device 110 may be referred to as primary user equipment (UE) and additional UE, respectively, when used in the context of interfacing with a long term evolution (LTE) network included in access network 115. The LTE network may be included in the access network 115. Moreover, internet protocol multimedia subsystem (IMS) services may be included in services network 120, as will be described in more detail below in regards to FIG. 1B.

FIG. 1B is a block diagram of an exemplary long term evolution (LTE) based network environment 150 that may add an additional user equipment (UE) as an endpoint for a VoLTE service according to the first messaging embodiment. LTE based network environment 150 may include a primary UE 155, an additional UE 160, an evolved universal terrestrial radio access network (E-UTRAN) 165, an evolved packet core (EPC) 170, and internet protocol multimedia subsystem (IMS)/edge network devices 175.

Primary UE 155 and additional UE 160 may communicate with E-UTRAN 165 and EPC 170 over wireless channels to exchange information with other network devices, including IMS/edge network devices 175. EPC 170 may exchange data with IMS/edge network devices 175 directly over standard connections, and/or through a wide area network (not shown), as will be discussed in more detail in reference to FIG. 3. Primary UE 155 and additional UE 160 may exchange messages with IMS/Edge Network Devices 175, via E-UTRAN 165 and EPC 170, to facilitate the use of VoLTE communications.

For example, a user may communicate over a VoLTE service using primary UE 155. The VoLTE service may be supported in-part by IMS/edge network devices 175, and provided through EPC 170 and E-UTRAN 165. The user may find it convenient to access the VoLTE service though additional UE 160, which may access the VoLTE service through a network identifier (e.g., a phone number) associated with the primary UE 155. Upon being added and authorized to use the VoLTE service using the network identifier of primary UE 155, additional UE 160 does not replace primary UE 155, but instead serves as an additional device to receive and/or send VoLTE calls. In some cases, incoming calls may be received on both primary UE 155 and one or more additional UEs 160. In other cases, an initial incoming messages associated with VoLTE may be received by both primary user device 105 and additional user device 110. However, the user, as a matter of preference, may select which UE to employ for an ongoing VoLTE session in which subsequent exchanges are restricted to the selected UE after the session has been initiated by the user. Moreover, if desired, the user may switch UEs in mid-session if one UE becomes more preferable to the user than the other.

Further referring to FIG. 1B, which shows an exemplary high-level message exchange for establishing additional UE 160 as additional endpoint for a VoLTE service according to the first messaging embodiment. The message exchange may occur in the following sequence: (1) Additional UE 160 may provide a request to add additional UE 160 as an endpoint for the VoLTE services. The request in (1) may be made using a standard protocol, such as, for example, an HTTP POST message, and may include authenticating information and/or one or more identifiers, including a network identifier of primary UE 155. The network identifier of primary UE 155 may typically be a phone number, but may also include a user identifier associated with the VoLTE service, an IP address, a MAC address, etc. (2) IMS/edge network devices 175 may respond to the request by sending an SMS to the primary UE 160 to request the addition of UE

160. In other embodiments, the message in (2) may be sent using formats other than SMS, and also may include authenticating information such as a transaction ID (also referred to herein as TXN ID). The transaction ID may identify an association of additional UE 160 with the network identifier (e.g., phone number) of primary UE 155 for the VoLTE service. (3) Primary UE 155 may respond to the SMS message in (2) with a responding SMS message to IMS/Edge Network Devices 175 granting permission to add additional UE 160. The SMS message in (3) may be provided in an interactive manner by the user, and may include a particular text word or phrase in the SMS message payload provided by the user to be effective (e.g., "Yes—Add"), and may also provide validating information such as the transaction ID. (4) Additional UE 160 may then receive credentials for accessing the VoLTE service provided by IMS/edge network devices 175. The message in (4) may be in a standard format (e.g., an HTTP message) and include various tokens, personal identification numbers (PINs), etc. to authenticate the additional UE with the VoLTE service. Once the credentials are received, additional UE 160 may be used as an additional endpoint for the VoLTE service.

Details of the primary UE 155, additional UE 160, E-UTRAN 165, EPC 170, and IMS/edge network devices 175 are described below in relation to FIG. 3.

While FIG. 1B shows exemplary components of network environment 150, in other implementations, network environment 150 may include fewer components, different components, differently arranged components, or additional components than depicted in FIG. 1B. Additionally or alternatively, one or more components of network 100 may perform functions described as being performed by one or more other components.

FIG. 2A is a block diagram of exemplary network environment 100 which may add an additional endpoint based on a message according to a second messaging embodiment. Networking elements shown in FIG. 2A having the same reference numbers as network elements shown in FIG. 1A may identify the same or similar elements, and are not described again in relation to FIG. 2A.

FIG. 2A shows an exemplary high-level message exchange according to the second messaging embodiment which may occur in the following sequence: (1) Additional user device 110 may provide a request to add additional device 110 as an endpoint for services network 120. The request in (1) may be made using a standard protocol, and may include validation information (e.g., a push notification ID); however, a network identifier of primary user device 105 is optional in (1). (2) Services network 120 may respond to the request by sending validating information (e.g., a PIN) to additional user device 110. The message in (2) may be sent in a standard format, such as, for example, an HTTP POST message and displayed on the additional user device 110 for the user to enter into primary user device 105.

For example, additional user device 110 may display the PIN which was received in message (2), and also a destination which may be used to identify a device in services network 120 as a destination for the next message. In an embodiment, the user may enter into primary user device 105 the validating information and/or destination displayed on additional user device 110. (3) Once primary user device 105 receives the validating information (e.g., a PIN) and/or the destination from the user, primary user device 105 may send a message granting permission to add additional user device 110 for the service. The message may be sent to a network device in services network 120 as specified by the destination provided in message (2) and entered by the user. The destination may be an entitlement server, as will be explained in more detail in FIG. 7A. (4) Services network 120 may send to additional user device 110 the network identifier (e.g., a phone number) of primary user device 105 and validation and/or authentication credential(s) for accessing the service provided by services network 120. The message in (4) may be in a standard format (e.g., an HTTP message) and include various tokens, personal identification numbers (PINs), as credentials etc. Once the credential(s) are received, additional user device 110 may be used as an additional endpoint for the service provided by services network 120.

In summary, the second messaging embodiment shown in FIG. 2A may differ from the first messaging embodiment shown in FIG. 1A, in that, for the second messaging embodiment, the initial request (1) to add additional device 110 need not include a network identifier (e.g., phone number) of primary user device 105. Instead, in the second messaging embodiment, the network identifier (e.g., phone number) of the primary user device 105 may be obtained from header information of the message for permission to add additional device in message (3), and then sent to the additional user device 110 in message (4). Accordingly, the user need not ever enter the network identifier of primary user device 105 into additional user device 110 to specify an additional endpoint.

FIG. 2B is a block diagram of an exemplary LTE network which may add an additional UE as an endpoint for a VoLTE service based on an SMS message according to the second messaging embodiment. Networking elements shown in FIG. 2B having the same reference numbers as network elements shown in FIG. 1B may identify the same or similar elements, and are not described again in relation to FIG. 2B.

FIG. 2B shows an exemplary high-level message exchange according to the second messaging embodiment which may occur in the following sequence. (1) Additional UE 160 may provide a request to add additional UE 160 as an endpoint for VoLTE services. The request in (1) may be made using a standard protocol such as an HTTP POST. Message (1) may include validation information (e.g., a push notification ID), but does not have to include a network identifier (e.g. phone number) of primary user UE 155. (2) IMS/edge network devices 175 may respond to the request by sending validating credential information (e.g., a PIN) to additional UE 160, which may be sent in an HTTP POST message. The message in (2) may be sent in a standard format, such as, for example, an HTTP POST message and displayed on the additional UE 160. For example, additional UE 160 may display the PIN which was received in message (2), and also a destination which may be used to identify a device in IMS/edge network devices 175 as a destination for the next message. In an embodiment, the user may manually enter into primary UE 155 the validating information and/or destination displayed on additional user device 110. In other embodiments, a wireless pairing may be established between primary UE 155 and additional UE 160 via, for example, Bluetooth, where the validating information and/or the destination may be transferred wirelessly. (3) Once primary UE 155 receives the validating credential information (e.g., a PIN) and/or the destination from the user, primary UE 155 may send a message granting permission to add additional user device 110 for the service. The message in (3) may be sent to a network device, such as, for example, the entitlement server as described in more detail in FIG. 7A in IMS/edge network devices 175 as specified by the destination provided in message (2). (4) Additional user UE 160 may then receive the network identifier (e.g., a phone number) of primary UE 155, validation information, and/or authentication credential(s) for accessing the VoLTE service provided by IMS/edge network devices 175. The message in (4) may be in a standard format (e.g., an HTTP message) and include various tokens, personal identification numbers (PINs), as credentials etc. Once the validation information and/or credential(s) are received, additional UE 150 may be used as an additional endpoint for the VoLTE service.

FIG. 3 is a block diagram illustrating components of exemplary network environment 150. Network environment 150 may include an IMS 330 and a LTE wireless system, where the LTE system may include a plurality of UEs, including primary UE (P-UE) 155 and additional UE (A-UE) 160 as shown (plurally referred to as UEs 155 and 160), E-UTRAN 165, and EPC 170. Network environment 150 may further include a variety of network devices (wherein one or more may be referred to as edge devices) that are not necessarily part of IMS 330 or EPC 170, that may include entitlement server (ES) 340, short message service center (SMSc) 345, push notification server 350, and application server(s) 355. Network environment 150 may further include Wide Area Network (WAN) 360.

EPC 170 may include a mobility management entity (MME) 328, a serving gateway (SGW) device 322, a packet data network (PDN) gateway (PGW) 324, a Policy and Charging Rules Function (PCRF) 326, and a home subscriber server (HSS) 330. The E-UTRAN 165 may further include one or base stations, such as, for example, eNodeBs 310-1, . . . , 310-N (referred to plurally as "eNodeBs 310," and specifically as "eNodeB 310-$x$," where x=1, . . . N, when referring to particular embodiments).

IMS 330 may include a serving call session control function (S-CSCF) and/or an interrogating call session control function (I-CSCF), referred to herein as S/I CSCF 336, web gateway (WGW) 338, which may be embodied, for example, as a proxy call session control function (P-CSCF). IMS 330 may further include a home subscriber server (HSS) 347. Other elements may be included in IMS 330, but are not shown in FIG. 3 for brevity.

Network environment 150 may further include one or more devices that are physical and/or logical entities interconnected via standardized interfaces. Network environment 150 may provide wireless packet-switched services and wireless IP connectivity to UEs to provide, for example, data, voice, and/or multimedia services. It is noted that FIG. 3 depicts a representative network environment 150 with exemplary components and configuration shown for purposes of explanation. Other embodiments may include additional or different network entities in alternative configurations than which are exemplified in FIG. 3.

Further referring to FIG. 3, each eNodeB 310-$x$ may include one or more devices and other components having functionality that allow UEs 155 and 160 to wirelessly connect to E-UTRAN 165. ENodeBs 310 may interface with EPC 170 via a S1 interface, which may be split into a control plane S1-C interface and a data plane S1-U interface. S1-C interface may interface with MME 328. S1-C interface may be implemented, for example, with a protocol stack that includes a Network Access Server (NAS) protocol and/or Stream Control Transmission Protocol (SCTP). S1-U interface may interface with SGW 322 and may be implemented, for example, using a General Packet Radio Service Tunneling Protocol version 2 (GTPv2). eNodeB 310-$x$ may communicate with other eNodeBs 310 via an X2 interface (not shown). The X2 interface may be implemented, for example, with a protocol stack that includes an X2 application protocol and SCTP.

MME device 328 may implement control plane processing for a wireless network supported by E-UTRAN 165. For example, MME device 328 may implement tracking and paging procedures for UEs 155 and 160, may activate and deactivate bearers for UEs 155 and 160, may authenticate a user of UEs 155 and 160, and may interface to non-LTE radio access networks. MME 328 may also select a particular SGW 322 for a particular UE 155 and/or 160. A particular MME 328 may interface with other MME devices (not shown) in EPC 170 and may send and receive information associated with UEs 155 and 160, which may allow one MME device to take over control plane processing of UEs 155 and 160 serviced by another MME device, if the other MME device becomes unavailable. MME device 118 may communicate with SGW 322 through an S11 interface that may be implemented, for example, using GTPv2. S11 interface may be used to create and manage a new session for a particular UE 155 and/or 160. S11 interface may be activated when MME device 328 needs to communicate with SGW 322, such as when the particular UE 155 or 160 attaches to EPC 170, when bearers need to be added or modified for an existing session for the particular UE 155 or 160, when a connection to a new PGW 324 needs to created, or during a handover procedure (e.g., when the particular UE 155 or 160 needs to switch to a different SGW 322).

HSS device 330 may store information associated with UEs 155 and 160 and/or information associated with users of UEs 155 and 160. For example, HSS device 330 may store user profiles that include authentication and access authorization information. MME device 328 may communicate with HSS device 330 through an S6a interface 128 that may be implemented, for example, using a Diameter protocol.

PGW 324 may function as a gateway to other network systems, such as IMS 330, and/or various network devices/edge devices which may include, for example SMSc 345, entitlement server 340, and/or WAN 360. PGW 324 may make connections through an SGi interface, based on, for example, a Radius protocol. A particular UE 155 or 160, while connected to a single SGW 322, may be connected to multiple PGWs 324, one for each packet network with which UE 155 or 160 communicates. PGW 324 may also interface to IMS 330 through WGW 338 using an SGi interface based on a Radius protocol.

PCRF 326 provides policy control decision and flow based charging control functionalities. PCRF 326 may provide network control regarding service data flow detection, gating, Quality of Service (QoS) and flow based charging, etc. PCRF 326 may determine how a certain service data flow shall be treated, and may ensure that user plane traffic mapping and treatment is in accordance with a user's subscription profile. PCRF 326 may communicate with PGW 324 using a Gx interface 124 based on, for example, a Diameter protocol.

IMS 330 may provide voice and multimedia services, such as, for example, VoLTE, to UEs 155 and 160, using the Session Initiation Protocol (SIP). IMS 330 may provide services to UE 155 and 160 by communicating to EPC 170 through WGW 338. For example, WGW 338 and EPC 170 may communicate over an SGi interface using the Radius protocol. In an embodiment, WGW 338 may be realized or implemented by a P-CSCF, and be part of an CSCF unit which includes an S-CSCF and an I-CSCF (which are illustrated in FIG. 3 as one network element S/I-CSCF 336). S/I-CSCF 336 may communicate with HSS 347 over a Cx interface using, for example, the Diameter protocol. HSS 347 in IMS 330 may maintain user profile and location information and may be responsible for name/address resolution. HSS 347 may also perform authentication and/or authorization for services supported by IMS 330. In addition, HSS 347 may coordinate with HSS 330 in EPC 170 by sharing information for services used over LTE bearers, including VoLTE services. S/I-CSCF 336 may also communicate with PCRF 326 in EPC 170 using an Rx interface, which may be based on a Diameter protocol. Over the Rx interface, PCRF 326 may, for example, confirm that call media requests conform to appropriate policy, open gates or pinholes in the media route, and/or specify QoS for sessions.

S/I-CSCF 336 may also interface to various network devices outside of IMS 330 and EPC 170 over a Ma or ISC interface, which may use the session initiation protocol (SIP). For example, S/I-CSCF 336 may interface with entitlement server 340, SMSc 345, push notification server 350, and/or application server(s) 355.

Entitlement server 340 may authenticate users for the VoLTE services and validate the users for services for which they are authorized. Entitlement server 340 may work in conjunction with HSS 347 and/or HSS 330 to perform validation and/or authentication for users associated with UEs 155 and 160. Entitlement server 340 may generate various personal identification numbers (PINs), transaction identifiers (TXN IDs), etc.

SMSc 345 may route SMS messages through both EPC 170 and IMS 330 which may be transmitted and/or received by UEs 155 and 160. Entitlement server 340 and/or SMSc may also have separate connections to EPC 170 through PGW 324 using, for example, and SGi interface.

Push notification server 350 may send (i.e., push) various notification messages to UEs 155 and 160, and may have a persistent connection with one or more UEs 155 and 160. Push notification sever 350 may also share a persistent connection with entitlement server 340. Entitlement server 340 may be registered with push notification server 350 to send push notification to UEs 155 and 160. The push notification server 350 may include a network element under the control of a network provider, or may be a network device operated by a third party, such as a device manufacture, cloud services provider, software manufacture, and/or any other type of over the top services provider (OTT).

Application server(s) 355 may provide support for specific multimedia applications and services through IMS 355, including VoLTE. For example, application server(s) 355 may include any type of web server, media repository, streaming source, etc., that can provide UEs 155 and 160 with content that may be requested by the user, which may include form of media, text, audio, image, video, etc., which can be requested by the user through UE 150. Additionally or alternatively, application server(s) 355 provides any type of connections associated with any communications provider (e.g., other wireless carrier, over the top (OTT) service, etc.), and thus provide UEs 155 and 160 with voice, text, and/or video communications with other users.

WAN 360 may include any type wired or wireless network covering larger areas. For example, WAN 360 may include a metropolitan area network (MAN), a Public Switched Telephone Network (PSTN), an ad hoc network, an intranet, the Internet, a fiber optic-based network, a wireless network, and/or a combination of these or other types of networks. WAN 360 may be an IP based network or utilize MultiProtocol Label Switching (MPLS), and may include a mesh network (e.g., IEEE 801.11s) and/or or a WiMAX IEEE 802.16. WAN 360 may include one or more circuit-switched networks and/or packet-switched networks.

While FIG. 3 shows exemplary components of network environment 150, in other implementations, network 150 may include fewer components, different components, differently arranged components, or additional components than depicted in FIG. 3. Additionally or alternatively, one or more components of network environment 150 may perform functions described as being performed by one or more other components.

Figure 4:
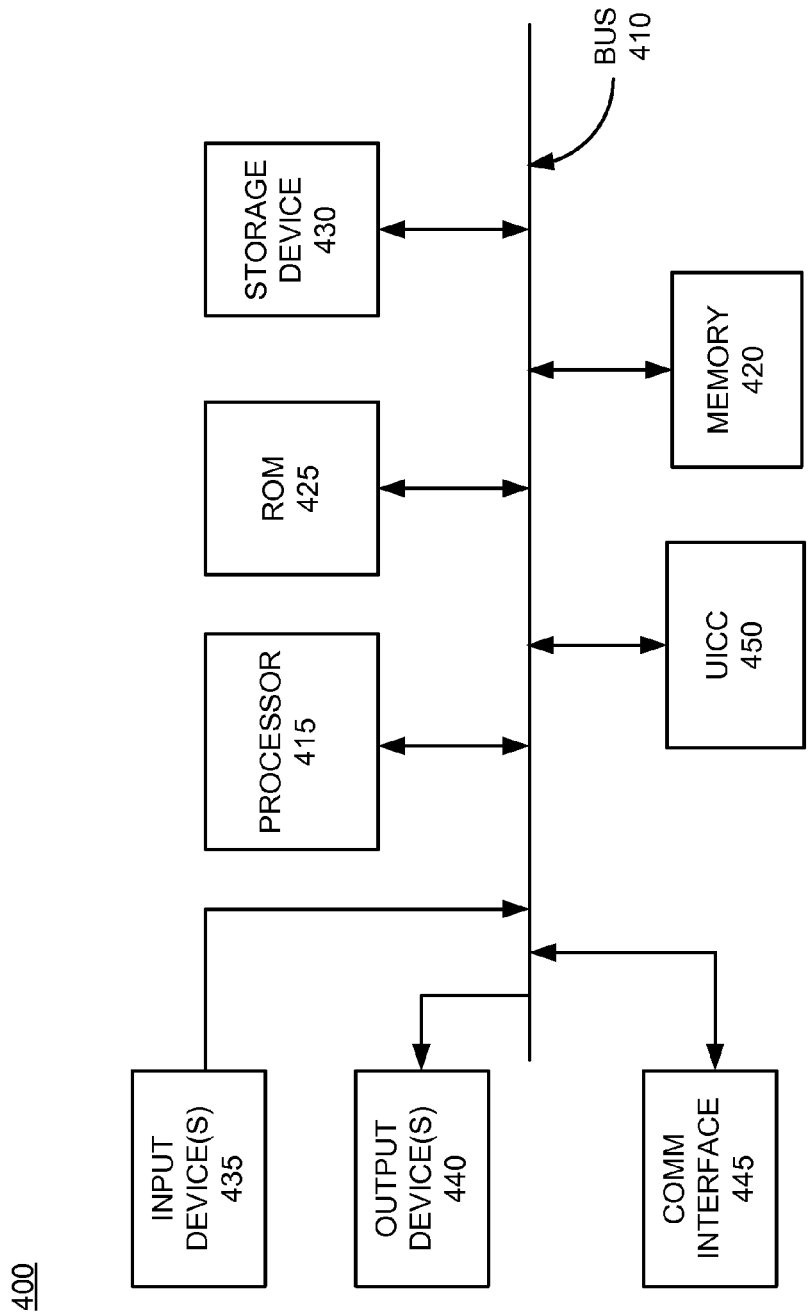
FIG. 4 is a block diagram showing exemplary components of a mobile device according to an embodiment.

FIG. 4 is a block diagram showing exemplary components of a UE 400 according to an embodiment. UE 400 may include any mobile device configured to communicate with eNodeBs 310 via wireless signals. For example, UE 400 may include a portable communication device (e.g., a mobile phone, a smart phone, a phablet device, a global positioning system (GPS) device, and/or another type of wireless device); a telephone terminal; a personal computer or workstation; a server device; a laptop, tablet, wearable computer (e.g., smart watch), or another type of portable computer; a media playing device; a smart TV, a portable gaming system; a music or media playing device, and/or any type of mobile device with wireless communication capability.

UE 400 may include a bus 410, a processor 415, memory 420, a read only memory (ROM) 425, a storage device 430, one or more input device(s) 435, one or more output device(s) 440, a communication interface 445, and universal integrated circuit card (UICC) 450. Bus 410 may include a path that permits communication among the elements of UE 400.

Processor 415 may include a processor, microprocessor, or processing logic that may interpret and execute instructions. Memory 420 may include a random access memory (RAM) or another type of dynamic storage device that may store information and instructions for execution by processor 415. ROM 425 may include a ROM device or another type of static storage device that may store static information and instructions for use by processor 415. Storage device 430 may include a magnetic and/or optical recording medium and its corresponding drive.

Input device(s) 435 may include one or more mechanisms that permit an operator to input information to UE 400, such as, for example, a keypad or a keyboard, a microphone, voice recognition, components for a touchscreen, and/or biometric mechanisms, etc. Output device(s) 440 may include one or more mechanisms that output information to the operator, including a display, a speaker, etc. Communication interface 445 may include any transceiver mechanism that enables UE 400 to communicate with other devices and/or systems. For example, communication interface 445 may include mechanisms for communicating with another device or system via a network. In an embodiment, communication interface 445 may include may include a network interface card (e.g., Ethernet card) for wired communications and/or a wireless network interface (e.g., a WiFi) card for wireless communications. Communication interface 445 may also include a universal serial bus (USB) port for communications over a cable, a Bluetooth or Bluetooth LE wireless interface, an RFID interface, an NFC wireless interface, and/or any other type of interface that converts data from one form to another form. In an embodiment, the Bluetooth and/or a Bluetooth low energy (LE) transceiver which may be used to transfer credentials and/or network identifiers (e.g., phone numbers) between UEs 400 without the user having to manually enter such information. The credentials and/or network identifiers may be stored in storage device 430 and/or memory 420 so minimize transfers of such information when working with different services.

Universal integrated circuit card (UICC) 450 may be inserted into a card interface (UF) (e.g., a smart card or Subscriber Identifier Module (SIM) card interface) of UE 400. UICC 450 may be a tamper-resistant platform (e.g., a single-chip secure microcontroller) capable of securely hosting applications and their associated confidential and/or cryptographic data (e.g., key management) in accordance with the rules and security requirements set forth by a set of trusted authorities. UICC 450 may securely store applications and data to permit UE 400 to perform trusted exchanges with other network entities. Secure information stored in UICC 450 may be managed in accordance with rules and security requirements provided by established trusted authorities. UICC 450 may provide the security and confidentiality required to perform validation of a user's identity to network environment 100 or 150. UICC 450 may include, for example, a Universal Integrated Circuit Card (UICC). In other embodiments, other cards such as a removable user identity card (R-UIM), a subscriber identity module (SIM), a universal subscriber identity module (USIM), or an Internet Protocol (IP) multimedia services identity module (ISIM) may also be used.

UE 400 may perform certain operations or processes, as may be described in detail below. UE 400 may perform these operations in response to processor 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into memory 420 from another computer-readable medium, such as storage device 430, or from another device via communication interface 445. The software instructions contained in memory 420 may cause processor 415 to perform operations or processes that will be described in detail with respect to FIG. 8. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE 400 illustrated in FIG. 4 is for illustrative purposes only. It should be understood that other configurations may be implemented. Therefore, UE 400 may include additional, fewer and/or different components than those depicted in FIG. 4.

Figure 5:
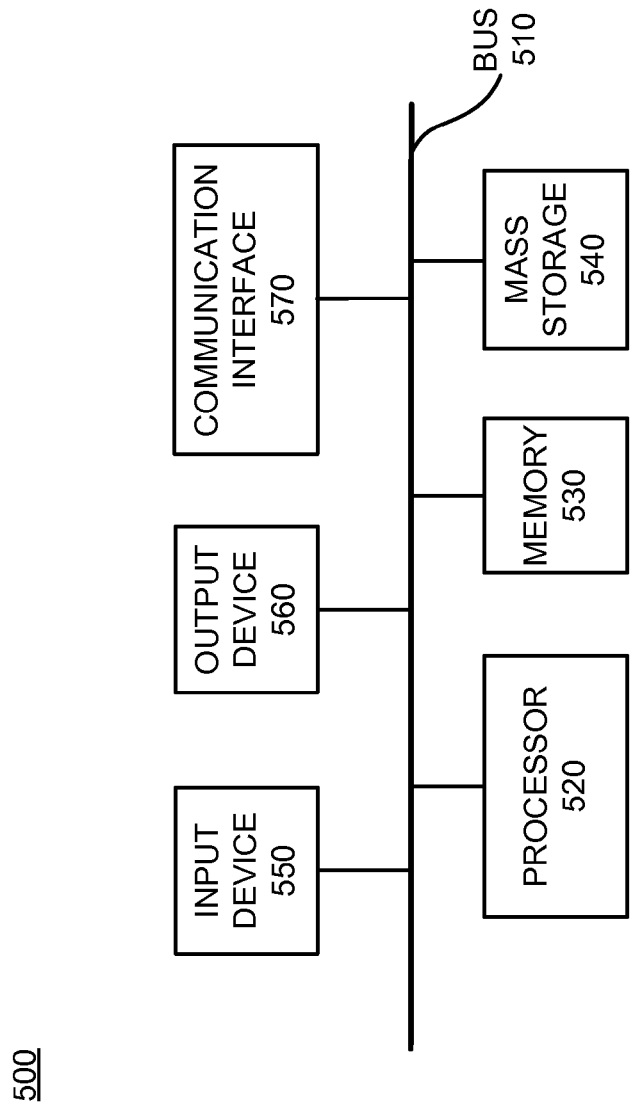
FIG. 5 is a block diagram showing exemplary components of a network device according to an embodiment.

FIG. 5 is a block diagram showing exemplary components of a network device 500 (also referred to herein as a "network element") according to an embodiment. Network device 500 may correspond to a WGW 338, entitlement server 340, SMSc 345, push notification server, 350, and/or application servers 355. Network device 500 may include a bus 510, a processor 520, a memory 530, mass storage 540, an input device 550, an output device 560, and a communication interface 570. In some embodiments, one or more specific network devices, such as, for example, WGW 338, entitlement server 340, SMSc 345, push notification server 350, and/or application servers 355, may be realized as software modules and/or as virtualized machines executing on a single network device 500.

Bus 510 includes a path that permits communication among the components of network element 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, processor 520 may be an x86 based CPU, and may use any operating system, which may include varieties of the Windows, UNIX, and/or Linux. Processor 520 may also use high-level analysis software packages and/or custom software written in any programming and/or scripting languages for interacting with other network entities that are communicatively coupled to a network.

Memory 530 may include any type of dynamic storage device that may store information and/or instructions, for execution by processor 520, and/or any type of non-volatile storage device that may store information for use by processor 520. For example, memory 530 may include a RAM or another type of dynamic storage device, a ROM device or another type of static storage device, and/or a removable form of memory, such as a flash memory. Mass storage device 440 may include any type of on-board device suitable for storing large amounts of data, and may include one or more hard drives, solid state drives, and/or various types of redundant array of independent disk (RAID) arrays.

Input device 550, which may be optional, can allow an operator to input information into network device 500, if required. Input device 550 may include, for example, a keyboard, a mouse, a pen, a microphone, a remote control, an audio capture device, an image and/or video capture device, a touch-screen display, and/or another type of input device. In some embodiments, network device 500 may be managed remotely and may not include input device 550. Output device 560 may output information to an operator of network device 500. Output device 560 may include a display (such as an liquid crystal display (LCD)), a printer, a speaker, and/or another type of output device. In some embodiments, network device 500 may be managed remotely and may not include output device 560.

Communication interface 570 may include a transceiver that enables network device 500 to communicate within a network with other devices and/or systems. The communications interface 570 may be configured for wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 570 may include a transmitter that converts baseband signals to RF signals and/or a receiver that converts RF signals to baseband signals. Communication interface 570 may be coupled to one or more antennas for transmitting and receiving RF signals. Communication interface 570 may include a logical component that includes input and/or output ports, input and/or output systems, and/or other input and output components that facilitate the transmission/reception of data to/from other devices. For example, communication interface 570 may include a network interface card (e.g., Ethernet card) for wired communications and/or a wireless network interface (e.g., a WiFi) card for wireless communications.

As described below, network device 500 may perform certain operations relating to, for example, WGW 338, entitlement server 340, SMSc 345, push notification server 350, and/or application server(s) 355. Network device 500 may perform these operations according to one or more of the aforementioned network elements in response to processor 520 executing software instructions contained in a computer-readable medium, such as memory 530 and/or mass storage 540. The software instructions may be read into memory 530 from another computer-readable medium or from another device. The software instructions contained in memory 530 may cause processor 520 to perform processes described herein. For example, network device 500 may realize and perform the functionality of entitlement server 340, as shown, for example, in process 800 depicted in FIG. 8, and/or process 900 depicted in FIG. 9. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of network device 500, in other implementations, network device 500 may include fewer components, different components, additional components, or differently arranged components than depicted in FIG. 5.

Figure 6A:
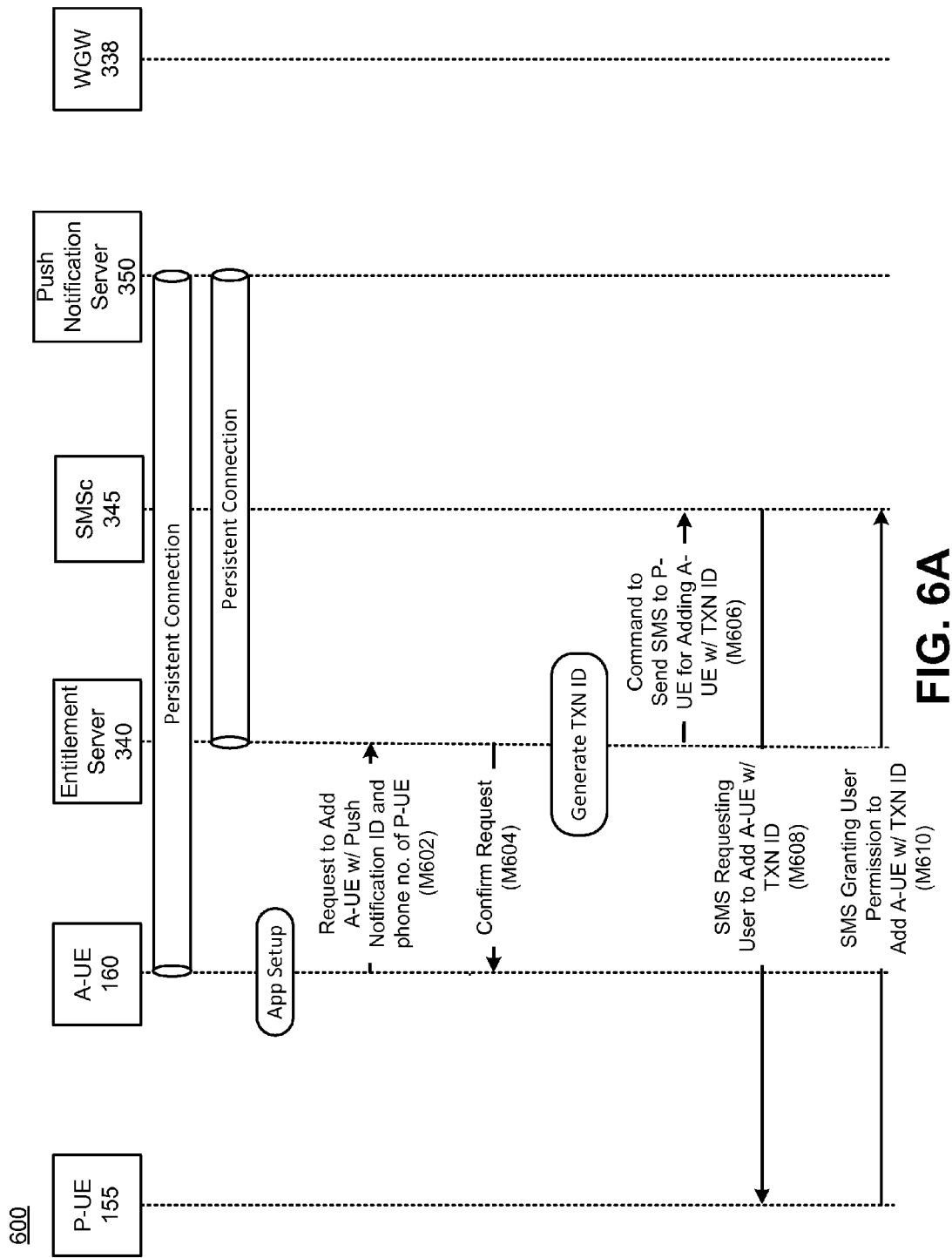
FIGS. 6A and 6B are signal flow diagrams depicting exemplary messages exchanged between network devices according to the first messaging embodiment.
Figure 6B:
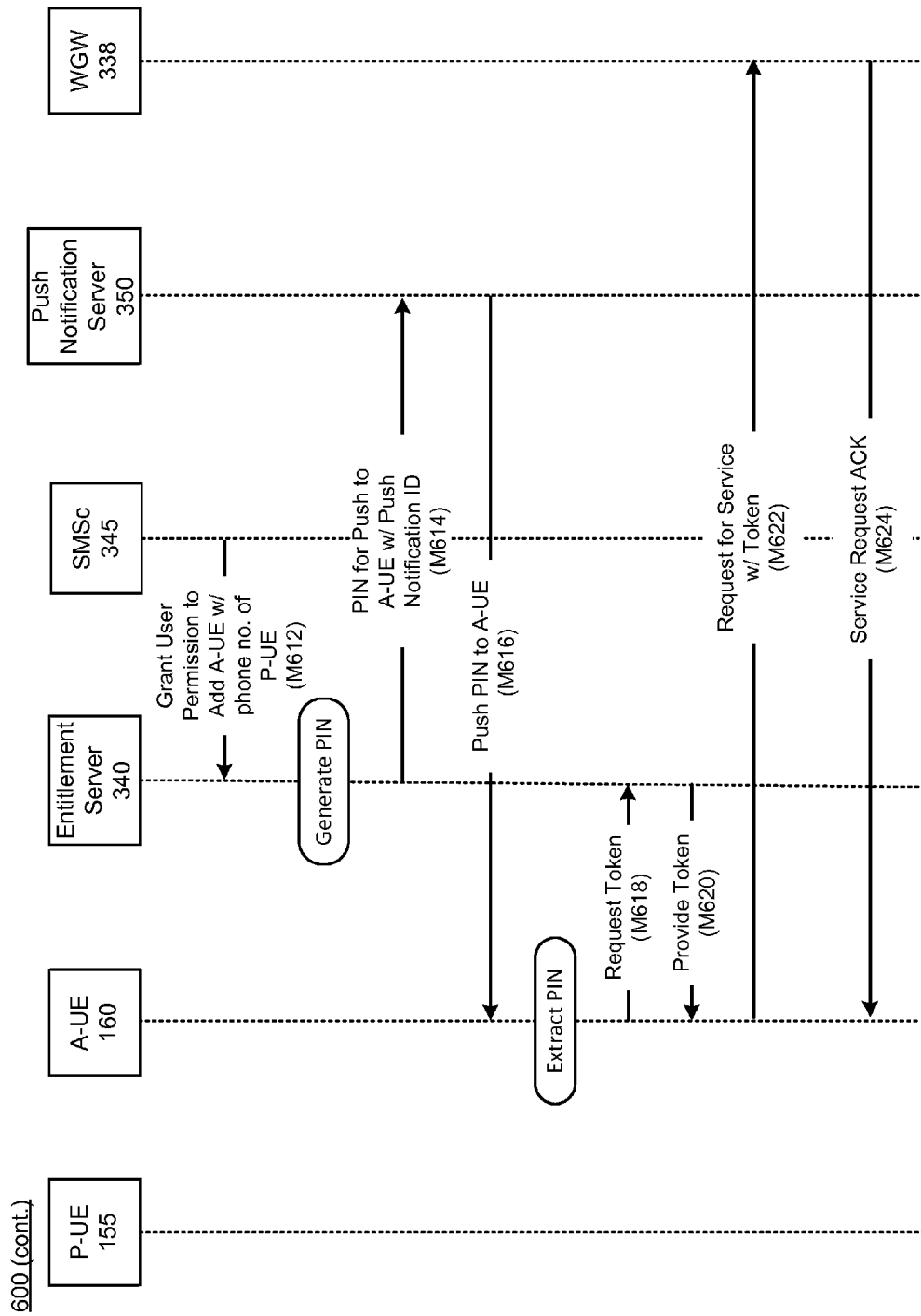

FIGS. 6A and 6B are signal flow diagrams 600 depicting exemplary messages exchanged between network devices within network environment 150 according to the first messaging embodiment. Referring to FIG. 6A, once A-UE 160 powers up and establishes a connection to network environment 150, A-UE 160 establishes a persistent connection with push notification server 350 so that A-UE 160 may receive push messages any time thereafter. A persistent connection between entitlement server 340 and SMSc 345 may also be established, where the entitlement server 340 is registered with push notification server 350 to send push message notifications. A user may install and execute an application on A-UE 160 that is compatible with service for which the user has an interest. The application may run through a setup routine, which executes upon initializing A-UE 160 with the service for the first time the service is used with the A-UE 160, or for re-initializations of the A-UE 160 with the service thereafter, if necessary. A-UE 160 may send a request to entitlement server 340 to add A-UE 160 as an additional endpoint (M602). The request may include a push notification ID and a network identifier for P-UE 155. The push notification ID may be a validating and/or identifying credential used by push notification server 350 to send push messages to A-UE 160. The network identifier for P-UE 155 may be a phone number, an internet protocol (IP) address, a media access controller (MAC) address, a user identifier associated with the service, etc. Message M602 may be provided, for example, using an HTTP Post to entitlement server 340.

The network identifier for P-UE 155 may be manually entered by the user during the execution of the setup routine. The network identifier of P-UE 155 may be stored on A-UE 160 so that for subsequent initializations (e.g., when signing up for additional services), or for re-initializations (if the connection of the A-UE 160 to the service ever needs to be reset), the network identifier may be recalled from memory instead of being re-entered by the user. Alternatively, the network identifier of P-UE 155 may be provided to A-UE 160 wirelessly, such as, for example, during a Bluetooth pairing. The paring between UEs 155 and 160 may be initiated by the setup routine through application programming interfaces (APIs) for accessing system resources on A-UE 160.

The entitlement server 340 may respond to message M602 by sending A-UE 160 a confirmation message M604. The confirmation of the request may be, for example, provided by an HTTP 200 OK message. Entitlement server 340 may then generate a transaction identifier (TXN ID), which identifies an association of the A-UE 160 with the network identifier (e.g., a phone number as shown in the embodiment of FIG. 6A) of P-UE 155 for the service. In an embodiment, different transaction identifiers would be used associating P-UE 155 and A-UE 160 as endpoints for different services. In other words, the TXN ID may be specific to a service. The entitlement server 340 may then send a command to have the SMSc 340 provide a message to P-UE 155 requesting permission to add A-UE 160 as an additional endpoint (M606). The command M606 may include instructions, codes (validation and/or authentication), or specific data to assist in adding A-UE 160 as an additional endpoint. For example, command M606 may include the TXN ID generated earlier, and also specific text a user may enter (e.g., YES-ADD") in reply to add A-UE 160 as an endpoint.

In response to receiving the command M606, SMSc 345 may send an SMS message to P-UE 155 requesting the user to add A-UE 160 as an additional endpoint (M608). The SMS message M606 may include instructions to have the user reply with a specific message (e.g., with text "YES-ADD") and/or a validating code such as the TXN ID. Alternatively, other types of validating/authenticating information may be included, such as, for example, codes based on two factor authentication. For two factor authentication, another physical device which has a validated association with the user may provide additional credentials for verification and/or authentication. Codes may be generated by an independent device, or P-UE 155 using a two-factor authentication application. P-UE 155, in response to the SMS message M608, may send an SMS reply to SMSc 345 granting permission to add A-UE 160 as an additional endpoint for the service (M610). The reply M610 may include TXN ID generated earlier by the entitlement server 340.

Referring to FIG. 6B, SMSc 345 may send a message to entitlement server 340 indicating the user has agreed to add A-UE 160 as an additional endpoint (M612). Message M612 may include the network identifier (e.g., phone number) of P-UE 155 for verification. Entitlement server 340 may then generate a personal identification number (PIN), and send a command to push notification server 350 to push the PIN to A-UE (M614). Command M614 may also include the push notification ID associated with A-UE 160. Push notification server 350 may then push a message including the PIN to A-UE 160 (M616). An HTTP push message may be used to deliver message M616 to A-UE 160. A-UE 160 may extract the PIN from message M616.

A-UE 160 may send a request for a token to entitlement server 340, wherein the request may include the PIN (M618). The token may be used as an authentication credential for accessing the service, and may be encrypted for security. In response, entitlement server 340 may respond to request M618 by sending the token to A-UE 160 (M620). Once A-UE 160 received the token, A-UE 160 may send a request to the WGW 338 for access to the service and to be added as an additional endpoint (M622). The request may include the token and the network identifier (e.g., phone number) of the P-UE 155. WGW 338 may forward the request to an appropriate network device (e.g., an application server 355). When the appropriate network device responds, WGW 338 may forward an acknowledgement (ACK) to A-UE 160 (M624). The service may include any type of session initiation protocol (SIP) service, cloud service, audio and/or video service, OTT communication services, etc. For example, if the service of interest by the user is a VoLTE communications service, message 622 sent by A-UE 160 may take the form of a SIP Registration request, which may include the phone number of P-UE 155 and the token. Message M624, provided through WGW 338, may be SIP 200 OK response sent to A-UE 160.

Figure 7A:
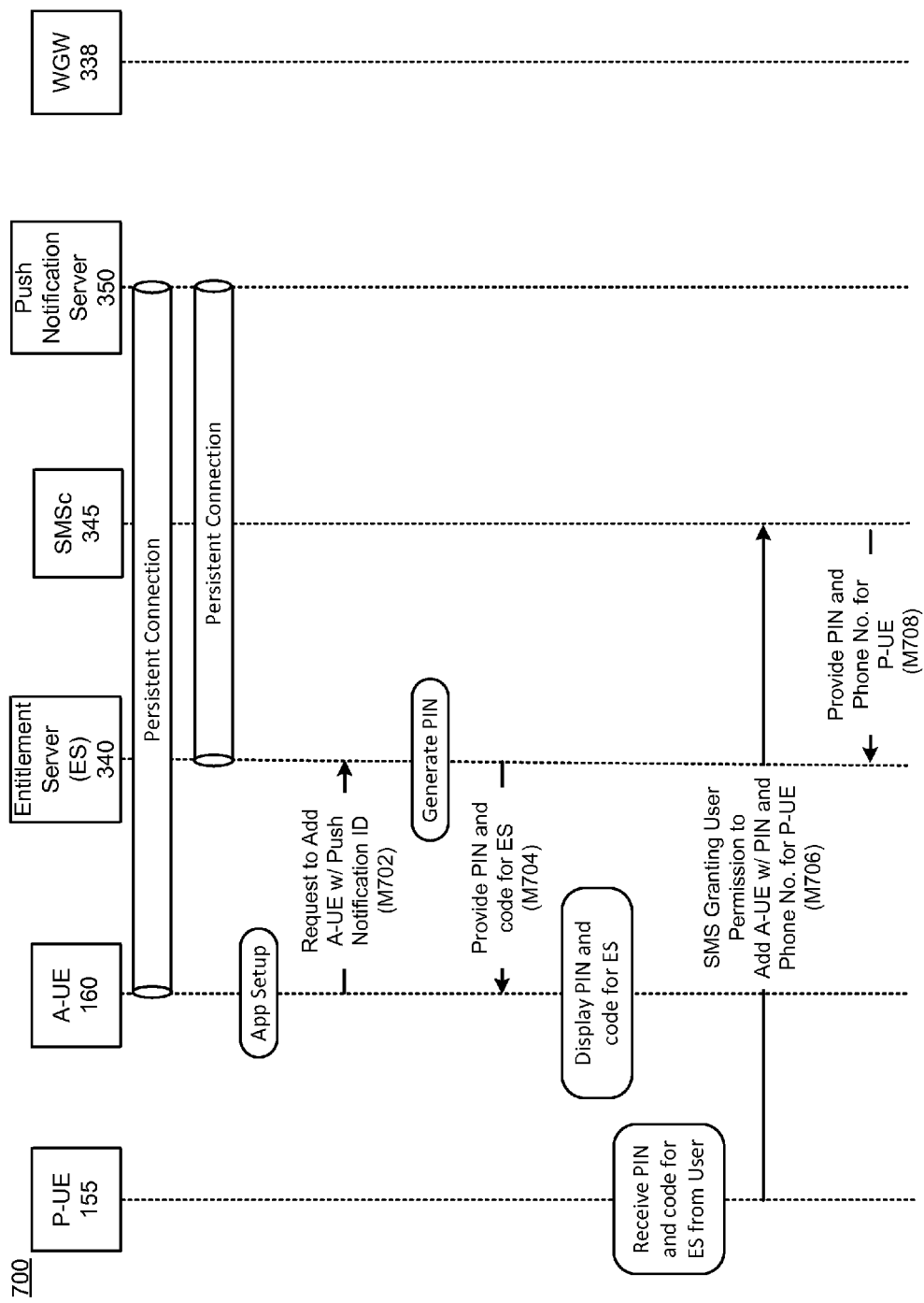
FIGS. 7A and 7B are signal flow diagrams depicting exemplary messages exchanged between network devices according to the second messaging embodiment.
Figure 7B:
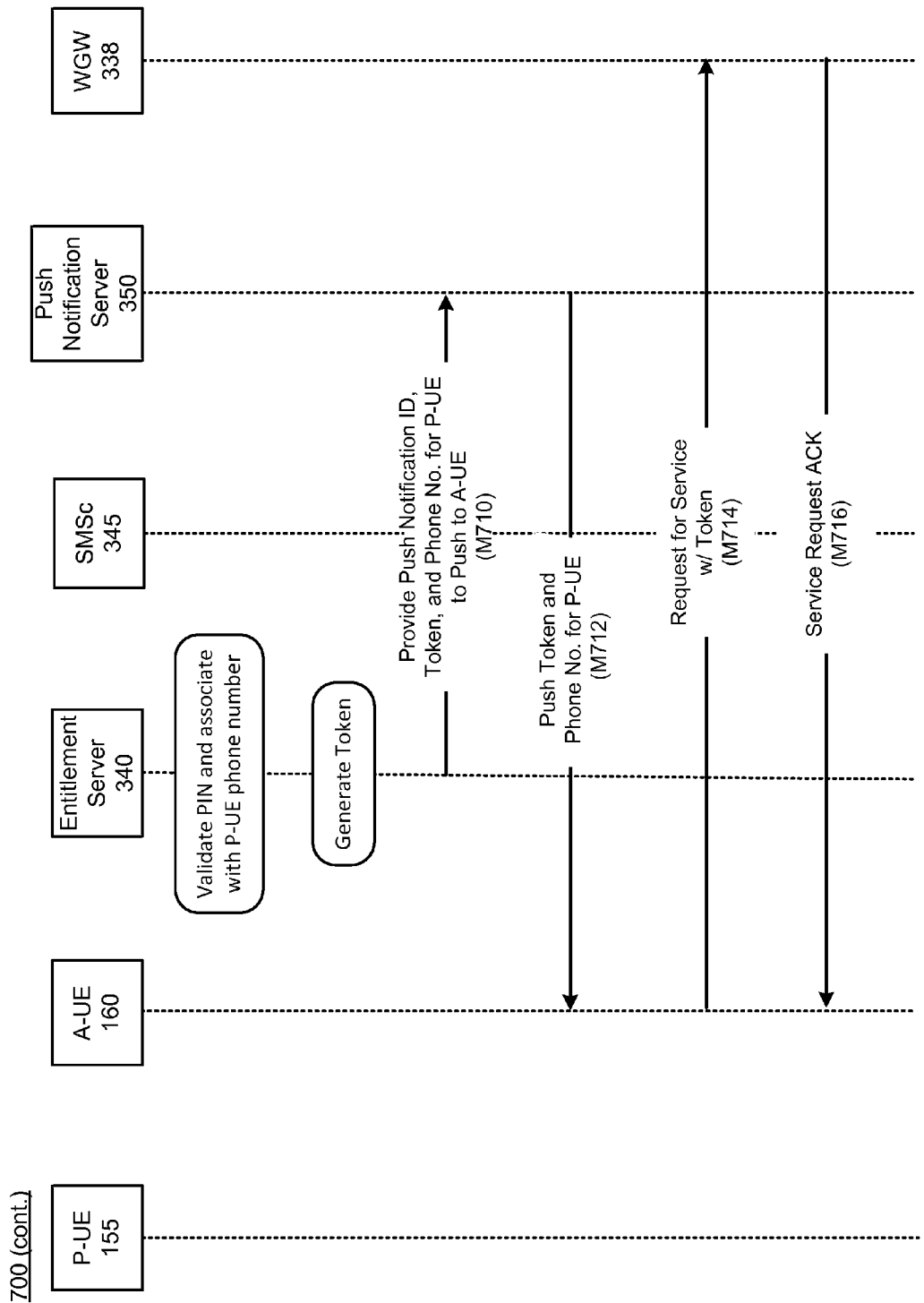

FIGS. 7A and 7B are signal flow diagrams 700 depicting exemplary messages exchanged between network devices according to the second messaging embodiment. The second messaging embodiment may further simplify the process of adding an additional endpoint, as the network identifier may be automatically determined from the header of a message, and thus may not be provided during initialization. Referring to FIG. 7A, once A-UE 160 powers up and establishes a connection to network environment 150, A-UE 160 may establish a persistent connection with push notification server 350, so that A-UE 160 may receive push messages any time thereafter. A persistent connection between entitlement server 340 and SMSc 345 may also be established, where the entitlement server 340 is registered with push notification server 350 to send push message notifications.

A user may install and execute an application on A-UE 160 that is compatible with service for which the user has an interest. The application may run through a setup routine, which executes upon initializing A-UE 160 with the service for the first time the service is used with the A-UE 160, or for re-initializations of the A-UE 160 with the service thereafter, if necessary. A-UE 160 may send a request to entitlement server 340 to add A-UE 160 as an additional endpoint (M702). The request may include a push notification ID, however, the network identifier for P-UE 155 is optional and need not be included in request M702. The push notification ID may be a validating and/or identifying credential used by push notification server 350 to send push messages to A-UE 160. Message M702 may be provided, for example, using an HTTP Post to entitlement server 340.

The entitlement server 340 may generate a PIN in response to receiving request M702, and respond to A-UE 160 by sending a message which includes the pin generated by entitlement server 340 (M704). In an embodiment, as shown in FIG. 7B, message M704 may also include one or more codes (e.g., a long code or short code for SMS messages, a hyperlink for HTTP messages, etc.) which may act as a network address and/or identifier for entitlement server 340. Message M704 may be provided as an HTTP OK message. Once A-UE 160 receives M704, A-UE 160 may display the PIN and, optionally, the code for entitlement server 340, to the user. The user may then type the PIN and the optional code for entitlement server 340 into P-UE 155. In another embodiment, P-UE 155 may instead receive the information over a secure wireless link. For example, if P-UE 155 and A-UE 160 are paired using a Bluetooth connection, the PIN, code, etc., may be provided wirelessly in an automatic manner, instead of having the user enter such information manually.

Once P-UE 155 receives the PIN and optional code for the entitlement server 340, P-UE 155 may send an SMS message to the entitlement server granting permission to add A-UE 160 as an additional endpoint. This exchange may be routed through SMSc 345 as follows: P-UE 155 send SMS message to SMSc 345 granting permission to add A-UE 160 (M706). Message M706 may include PIN in the message payload, and the network identifier (e.g. phone number) of P-UE 155, which may be contained in the header and/or other metadata within message M706. SMSc 345 may then provide PIN and the network identifier (e.g. phone number for P-UE 155) to entitlement server 340 (M708). Accordingly, entitlement server 340 may obtain the network identifier (e.g., phone number) of P-UE 155 without having to receive it from A-UE 160, as may be done in the first messaging embodiment 600 shown in FIGS. 6A and 6B.

Referring to FIG. 7B, entitlement server 340 may then validate the PIN received from the SMS message M706/M708 and associate the PIN with the network identifier (e.g. phone number) of P-UE 155. Entitlement server 340 may then generate a token for authenticating with the service. Once the token is generated, entitlement server 340 bundles the token with the push notification ID and a network identifier (e.g., the phone number) for the P-UE 155 in a message commanding push notification 350 server to push credentials to the A-UE 160 (M710). Push notification server 350 may then push the token and the network identifier (e.g., phone number) for the P-UE 155 to A-UE 160 (M712). Message M712 may be an HTTP message. The token may be used as an authentication credential for accessing the service, and may be encrypted for security.

Once A-UE 160 has received the token, A-UE 160 may send a request to the WGW 338 for access to the service and to be added as an additional endpoint (M714). The request may include the token and the network identifier (e.g., phone number) of the P-UE 155. WGW 338 may forward the request to an appropriate network device (e.g., an application server 355). When the appropriate network device responds, WGW 338 may forward an acknowledgement (ACK) to A-UE 160 (M716). The service may include any type of session initiation protocol (SIP) service, cloud service, audio and/or video service, OTT communication services, banking service, financial service, e-commerce service, etc. For example, if the service of interest by the user is a VoLTE communications service, message M714 sent by A-UE 160 may take the form of a SIP Registration request, which may include the phone number of P-UE 155 and the token. Message M716, provided through WGW 338, may be SIP 200 OK response sent to A-UE 160.

Figure 8:
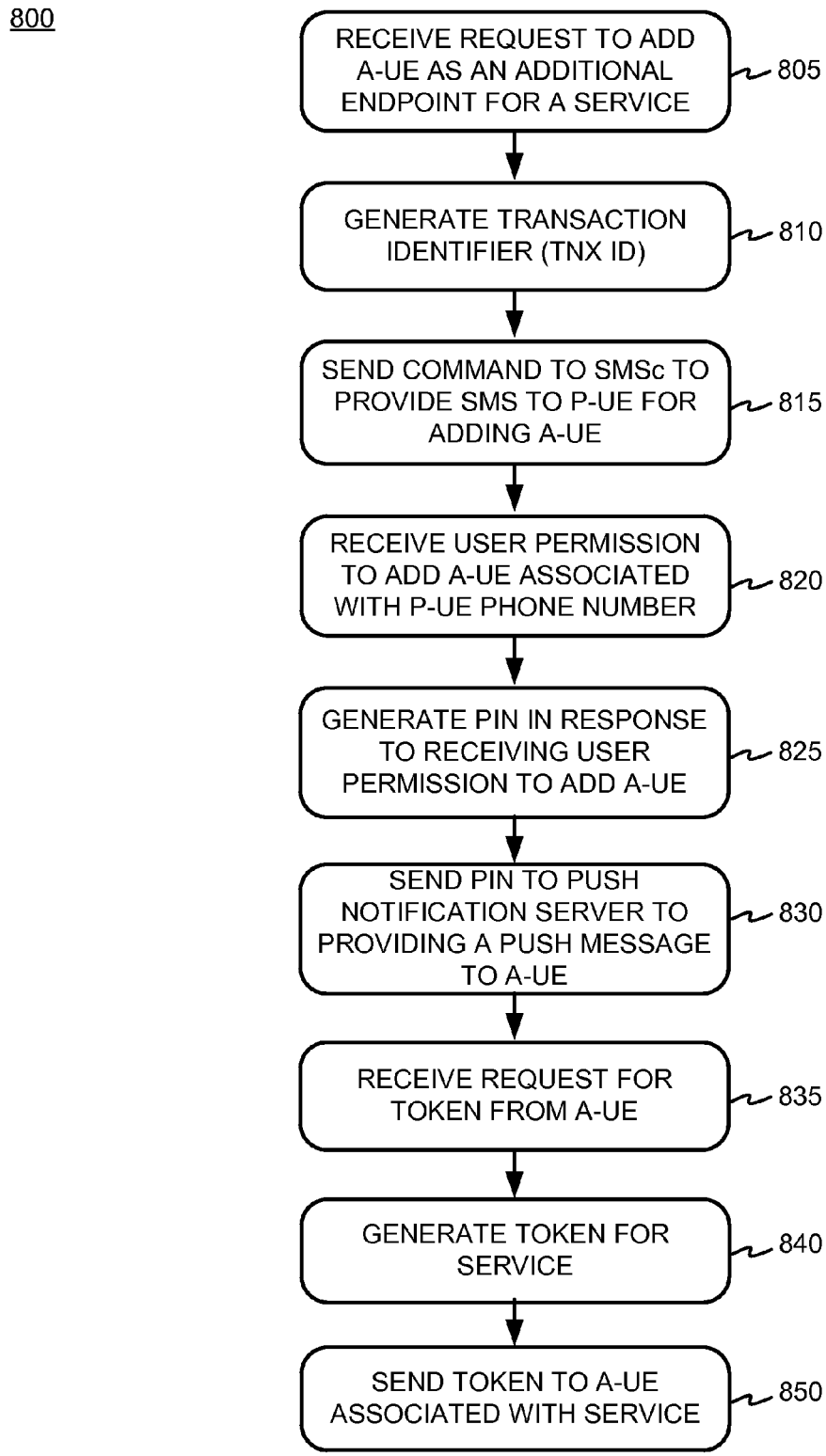
FIG. 8 is a flow chart showing an exemplary process for adding an additional endpoint according to the first messaging embodiment.

FIG. 8 is a flow chart showing an exemplary process 800 for adding an additional endpoint according to the first messaging embodiment. Process 800 may be performed on processor 520 of network device 500, embodied as, for example, an entitlement server 340. However, in some embodiments, network device 500 may also include SMSc 345, push notification server 350, and/or WGW 338, and process 800 may also be performed, either in whole or in part, on SMSc 345, push notification server 350, and/or WGW 338, or another device.

Processor 520 may receive a request to add A-UE 160 as an additional endpoint for a service associated with P-UE 155 (Block 805). The service may include a voice over internet protocol (VoIP) telephony service, a video messaging service, a text messaging service, e-commerce service, a financial service, a banking service, etc. The received request in Block 805 may include a push notification ID and/or a network identifier of P-UE 155. The network identifier may be a phone number, an IP address, a MAC address, etc. of P-UE 155. In an embodiment, the network identifier may be received prior to the request and stored with A-UE 160 for subsequent use with a variety of different services. In another embodiment, the network identifier of P-UE 155 may be provided to A-UE 160 through a pairing procedure over a wireless channel. The wireless channel may be established by a Bluetooth or a Bluetooth LE connection.

Processor 520 may generate a transaction identifier (TXN ID) in response to receiving the request (Block 810). The TXN ID may identify an association of the A-UE 160 with the network identifier of P-UE 155 for the service (e.g., a phone number when the service is a VoLTE service). Processor 520 may then send a command to provide a short message service (SMS) message to the P-UE 155 requesting permission to add A-UE 160 as the additional endpoint (Block 815). Processor 520 may receive a message granting permission to add the second UE as the additional endpoint, wherein the message includes a network identifier (e.g., phone number) assigned to the first UE (Block 820).

Processor 520 may generate one or more credential(s) for authorizing the A-UE 160 to access the service. The credentials may include a personal identification number (PIN) or a token. The credential(s) may be used by the A-UE 160 to register as an additional endpoint associated with P-UE 155 for a service. In an embodiment, processor 520 may generate a personal identification number (PIN) associated with the A-UE 160 for the service (Block 825).

Processor 520 may provide one or more credential(s) to the A-UE 160. For example, processor 520 may send the PIN to push notification server 350, wherein push notification server 350 may forward the PIN to the A-UE 160 (Block 830). Processor 520 may receive a request for a token associated with the service from the A-UE 160 (Block 835). Processor may generate a token associated with the service in response to the request for the token (Block 840). Processor 520 may then send the token to A-UE 160 associated with the service (Block 850).

Figure 9:
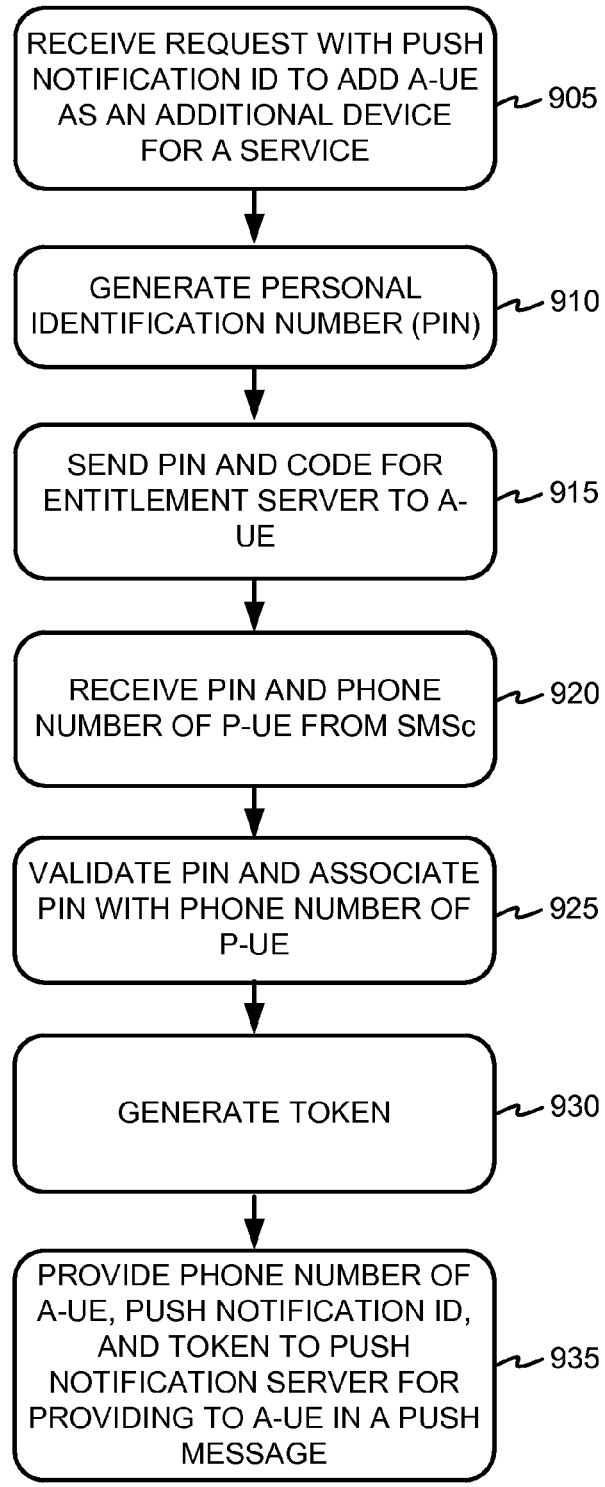
FIG. 9 is a flow chart showing an exemplary process for adding an additional endpoint according to the second messaging embodiment.

FIG. 9 is a flow chart showing an exemplary process 900 for adding an additional endpoint according to the second messaging embodiment. Process 900 may be performed on processor 520 of network device 500, embodied as, for example, an entitlement server 340. However, in some embodiments, network device 500 may also include SMSc 345, push notification server 350, and/or WGW 338, and process 900 may also be performed, either in whole or in part, on SMSc 345, push notification server 350, and/or WGW 338, or another device.

Processor 520 may receive a request to add A-UE 160 as an additional endpoint for a service associated with P-UE 155 (Block 905). The received request may include a push notification identifier. Processor 520 may generate a personal identification number (PIN) in response to receiving the request to add A-UE 160 (Block 910). Processor 520 may send the PIN and a code to A-UE 160 (Block 915). The code may be associated with a network identifier of entitlement server 340. Processor 520 may then receive the PIN and a network identifier (e.g. a phone number) of P-UE 155 from the short messaging service center (SMSc) (Block 920). The PIN and the network identifier may be provided in an SMS message, where the PIN may be provided in the payload of the SMS message, and the phone number (or other network identifier) may be found in the header of the SMS message received in Block 920. Processor 520 may then generate one or more credential(s) for authorizing the A-UE 160 to access the service. Generating the one or more credentials may include having processor 520 validate the PIN received from P-UE 155 (via SMSc 345) in Block 920, and associate the PIN with the network identifier (e.g., phone number) of P-UE 155 (Block 925). Processor 520 may then generate a token associated with the service (Block 930). Processor 520 may provide the network identifier (e.g., phone number) of the P-UE 155 and the credential(s) (e.g., the token) to A-UE 160 (Block 935). In Block 935, the processor 520 may provide the credential(s) by sending a command to push notification server 350 to forward the network identifier (e.g., phone number) of P-UE 155 and the token to A-UE 160.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6A-9, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving a request to add a second user equipment (UE) as an additional endpoint for a service associated with a first UE, wherein receiving the request to add the second UE comprises receiving a push notification ID and a network identifier of the first UE;
generating a transaction identifier in response to receiving the request;
sending a command to provide a short message service (SMS) message to the first UE requesting permission to add the second UE as the additional endpoint;
receiving a message granting permission to add the second UE as the additional endpoint, wherein the message includes the network identifier assigned to the first UE;
generating at least one credential for authorizing the second UE to access the service; and
providing the at least one credential to the second UE.

2. The method of claim 1, wherein generating at least one credential comprises:
generating a personal identification number (PIN) associated with the second UE for the service.

3. The method of claim 2, wherein providing the at least one credential to the second UE comprises:

sending the PIN to a push notification server, wherein the push notification server forwards the PIN to the second UE.

4. The method of claim 3, further comprising:
receiving a request for a token associated with the service from the second UE;
generating the token in response to the request for the token; and
sending the token to the second UE.

5. The method of claim 4, wherein receiving the request for a token comprises:
receiving the PIN from the second UE.

6. The method of claim 1, wherein the network identifier of the first UE is provided to the second UE and stored therein, prior to receiving the request to add the second UE for subsequent use with a plurality of services.

7. The method of claim 6, wherein the network identifier of the first UE is provided to the second UE over a one of a Bluetooth or a Bluetooth Low Energy connection.

8. The method of claim 1, wherein the at least one credential is used by the second UE to register for the service as the additional endpoint to the first UE.

9. The method of claim 1, wherein the at least one credential comprises at least one of a personal identification number or a token.

10. The method of claim 1, wherein the service comprises voice over internet protocol (VoIP) telephony, video messaging, text messaging, cloud service, e-commerce, or banking.

11. A network device, comprising:
an interface configured to communicate with a network;
a memory configured to store instructions; and
a processor, coupled to the interface and the memory, wherein the processor is configured to execute the instructions stored in the memory to:
receive a request to add a second UE as an additional endpoint for a service associated with a first UE, wherein, when receiving the request to add the second UE, the processor is further configured to execute the instruction to receive a push notification ID and a network identifier of the first UE,
generate a transaction identifier in response to receiving the request,
send a command to provide a short message service (SMS) message to the first UE requesting permission to add the second UE as the additional endpoint,
receive a message granting permission to add the second UE as the additional endpoint, wherein the message includes the network identifier assigned to the first UE,
generate at least one credential for authorizing the second UE to access the service, and
provide the at least one credential to the second UE.

12. The network device of claim 11, wherein, when generating the at least one credential, the processor is further configured to execute the instructions to:
generate a personal identification number (PIN) associated with the second UE for the service.

13. The network device of claim 12, wherein, when providing the at least one credential to the second UE, the processor is further configured to execute the instructions to:
send the PIN to a push notification server, wherein the push notification server forwards the PIN to the second UE.

14. The network device of claim 13, wherein the processor further executes the instructions to:
receive a request for a token associated with the service from the second UE,
generate the token in response to the request for the token, and
send the token to the second UE.

15. The network device of claim 14, wherein the request for a token associated with the service includes the PIN.

16. A method, comprising:
receiving a request to add a second user equipment (UE) as an additional endpoint for a service associated with a first UE, wherein the received request includes a push notification identifier and a network identifier of the first UE;
generating a personal identification number (PIN) in response to receiving the request;
sending, to the second UE, a code identifying an entitlement server and the PIN;
receiving the PIN and a phone number of the first UE from a short messaging service center (SMSc);
generating at least one credential for authorizing the second UE to access the service; and
providing the phone number of the first UE and the at least one credential to the second UE.

17. The method of claim 16, wherein generating at least one credential comprises:
validating the PIN; and
generating a token associated with the service.

18. The method of claim 16, wherein providing the at least one credential comprises:
sending the phone number and the at least one credential to a push notification server, wherein the push notification server forwards the phone number and the at least one credential to the second UE.

19. The method of claim 16, wherein sending, to the second UE, a code identifying an entitlement server and the PIN comprises:
sending the code and the PIN to a push notification server to forward to the second UE.

20. The method of claim 16, wherein the at least one credential is used by the second UE to register for the service as the additional endpoint to the first UE.

* * * * *